(12) United States Patent
Hanson et al.

(10) Patent No.: US 7,032,395 B2
(45) Date of Patent: Apr. 25, 2006

(54) TRANSPORT TEMPERATURE CONTROL UNIT AND METHODS OF DEFROSTING AN EVAPORATOR COIL OF THE SAME

(75) Inventors: Jay L. Hanson, Bloomington, MN (US); Steven B. Helgeson, Lakeville, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 10/395,744

(22) Filed: Mar. 24, 2003

(65) Prior Publication Data

US 2003/0202557 A1    Oct. 30, 2003

Related U.S. Application Data

(60) Provisional application No. 60/376,392, filed on Apr. 29, 2002.

(51) Int. Cl.
*F25D 21/06* (2006.01)

(52) U.S. Cl. .......................................... 62/151; 62/234

(58) Field of Classification Search ................ 62/151, 62/153, 155, 156, 234; 165/42, 43
See application file for complete search history.

(56) References Cited

U.S. PATENT DOCUMENTS

| | | | |
|---|---|---|---|
| 4,172,493 A | | 10/1979 | Jacobs |
| 4,344,294 A | | 8/1982 | Gelbard |
| 4,537,045 A | * | 8/1985 | Mayer .......................... 62/503 |
| 4,918,932 A | * | 4/1990 | Gustafson et al. ............. 62/89 |
| 4,977,751 A | * | 12/1990 | Hanson .......................... 62/81 |
| 4,993,233 A | * | 2/1991 | Borton et al. ................. 62/155 |
| 5,118,038 A | * | 6/1992 | Shimizu et al. ............. 237/2 A |
| 5,257,506 A | | 11/1993 | DeWolf et al. |
| 5,287,705 A | * | 2/1994 | Roehrich et al. ............ 62/50.3 |
| 5,291,745 A | * | 3/1994 | Hanson .......................... 62/89 |
| 5,363,669 A | | 11/1994 | Janke et al. |
| 5,369,962 A | | 12/1994 | Szynal et al. |
| 5,440,893 A | | 8/1995 | Davis et al. |
| 5,458,188 A | * | 10/1995 | Roehrich et al. ............. 165/64 |
| 5,469,715 A | | 11/1995 | Janke et al. |
| 5,493,867 A | | 2/1996 | Szynal et al. |
| 5,507,154 A | | 4/1996 | Grant |
| 5,515,689 A | | 5/1996 | Atterbury |
| 5,524,449 A | | 6/1996 | Ueno et al. |
| 5,530,885 A | * | 6/1996 | Kagohata ..................... 700/90 |
| 5,533,360 A | | 7/1996 | Szynal et al. |
| 5,555,736 A | * | 9/1996 | Wills et al. ................... 62/187 |
| 5,730,216 A | * | 3/1998 | Viegas et al. ............... 165/233 |
| 5,775,415 A | * | 7/1998 | Yoshimi et al. ............. 165/202 |

(Continued)

FOREIGN PATENT DOCUMENTS

JP        401223013 A  *  9/1989

(Continued)

*Primary Examiner*—Mohammad M. Ali
(74) *Attorney, Agent, or Firm*—Michael Best & Friedrich LLP (57) ABSTRACT

A transport temperature control unit and methods of defrosting an evaporator coil of a transport temperature control unit. The transport temperature control unit includes an evaporator coil, an ambient air temperature sensor for sensing an ambient air temperature, a return air temperature sensor for sensing a return air temperature, a discharge air temperature sensor for sensing a discharge air temperature, an evaporator coil temperature sensor for sensing an evaporator coil temperature, and a controller. The controller initiates a defrost cycle when a large temperature differential occurs over the evaporator coil.

6 Claims, 5 Drawing Sheets

U.S. PATENT DOCUMENTS 6,164,367 A * 12/2000 Kurahashi et al. ............ 165/42
6,205,800 B1    3/2001 Topper et al.
6,263,686 B1    7/2001 Burkhart
6,470,697 B1 * 10/2002 Nakamura et al. ............ 62/157

FOREIGN PATENT DOCUMENTS

JP    408268032 A  * 10/1996
JP    08327193  A  * 12/1996

* cited by examiner

Fig. 3c

TRANSPORT TEMPERATURE CONTROL UNIT AND METHODS OF DEFROSTING AN EVAPORATOR COIL OF THE SAME

This application claims the benefit of U.S. Provisional Application No. 60/376,392, filed on Apr. 29, 2002.

FIELD OF THE INVENTION

The present invention relates to a method of defrosting and, more particularly, to a method of defrosting an evaporator coil of a transport temperature control unit.

BACKGROUND OF THE INVENTION

Straight trucks and tractor-trailers are often used as a means to transport cargo that must be maintained at a predetermined or desired temperature during transportation in order to preserve the quality of the cargo. This cargo may be food, agricultural goods or various other temperature critical items. Hereinafter, any vehicle that transports cargo that must be maintained at a predetermined temperature during transportation will be referred to as a transportable vehicle or a transport vehicle. Hereinafter, the term cargo means any item that is transported, stored or otherwise supported within a conditioned space of a transport vehicle that must be maintained at a predetermined temperature.

Transport vehicles that transport such temperature sensitive cargo include a conditioned space. A temperature control unit controls the temperature within the conditioned space within a temperature range surrounding a selected thermal setpoint. Some transport vehicles have a plurality of conditioned spaces that may be maintained by the unit at the same thermal setpoint or varying thermal setpoints.

The temperature control unit can be programmed to cool or heat the conditioned space to the thermal setpoint. Frost can build-up on the temperature control unit when the temperature control unit is cooling the conditioned space. More particularly, frost, otherwise known as condensate, can build-up on an evaporator coil of the temperature control unit and decrease the efficiency of the temperature control unit while in the cooling mode. Defrost cycles are typically utilized to remove the condensate. A defrost cycle is performed by circulating a heated fluid through the evaporator coil. The heat from the fluid is passed to the evaporator coil, causing the condensate to melt. The temperature control unit returns to the cooling mode after defrosting and cools at a greater efficiency due to the decreased build-up of condensate on the evaporator coil.

Many varying types of defrost cycles exist, such as manual defrost cycles, fixed time defrost cycles and static pressure defrost cycles. A person manually initiates and terminates a manual defrost cycle, while the fixed time defrost cycle initiates and terminates on a fixed timer that is programmable with a time period. The static pressure defrost cycle initiates when the static pressure across the evaporator coil reaches undesirable levels and terminates when the static pressure is at a desirable level.

SUMMARY OF THE INVENTION

The present invention provides a method of defrosting an evaporator coil of a transport temperature control unit, the transport temperature control unit is operable to circulate refrigerant through the evaporator coil for cooling a conditioned space within a transportable vehicle, the method includes providing a temperature sensor, sensing a temperature with the temperature sensor, the temperature sensor being in communication with a controller operable to control the transport temperature control unit, communicating the temperature to the controller, and initiating a defrost cycle dependent on the temperature communicated to the controller, the controller initiating the defrost cycle.

The invention also provides a transport temperature control unit comprising an evaporator coil, a temperature sensor operable to sense a temperature, a controller operable to control the transport temperature control unit and being in communication with the temperature sensor to receive the temperature from the temperature sensor, the controller operable to initiate a defrost cycle dependent on the temperature.

The invention further provides a method of defrosting an evaporator coil of a transport temperature control unit, the transport temperature control unit is operable to circulate refrigerant through the evaporator coil for cooling a conditioned space within a transportable vehicle, the method includes providing a first temperature sensor, sensing a first temperature with the first temperature sensor, providing a second temperature sensor, sensing a second temperature with the second temperature sensor, comparing the first temperature to the second temperature to determine which of the first and second temperatures is lower, providing a third temperature sensor, sensing a third temperature with the third temperature sensor, comparing the second temperature to the third temperature to provide a measured temperature differential, comparing the measured temperature differential to a predetermined temperature differential corresponding to the lower of the first and second temperatures, and initiating a defrost cycle dependent on the lower of the first and second temperatures when the measured temperature differential is greater than or equal to the predetermined temperature differential.

Still further, the invention provides a method of defrosting an evaporator coil of a transport temperature control unit, the transport temperature control unit is operable to circulate refrigerant through the evaporator coil for cooling a conditioned space within a transportable vehicle, the method includes providing a first temperature sensor, sensing a first temperature with the first temperature sensor, providing a second temperature sensor, sensing a second temperature with the second temperature sensor, comparing the first temperature to the second temperature to provide a measured temperature differential, comparing the measured temperature differential to a predetermined temperature differential, and initiating a defrost cycle operable to remove condensate from the evaporator coil when the measured temperature differential is greater than or equal to the predetermined temperature differential.

Other features and advantages of the invention will become apparent to those skilled in the art upon review of the following detailed description, claims, and drawings.

Before an embodiment of the invention is explained in detail, it is to be understood that the invention is not limited in its application to the details of the construction and arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting. The use of "including", "comprising" and "having" and variations thereof herein is meant to encompass the items listed thereafter and equivalents thereof as well as additional items.

DETAILED DESCRIPTION OF THE DRAWINGS

Figure 1:
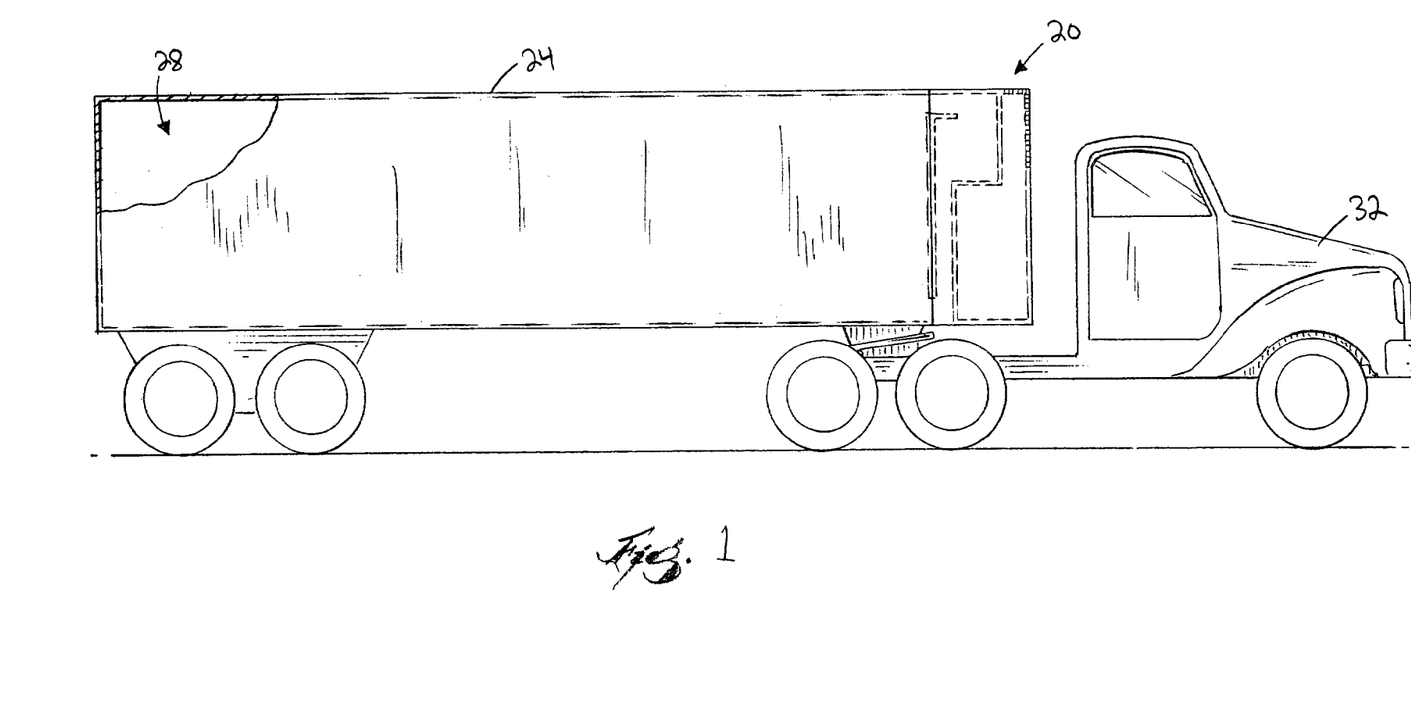
FIG. 1 is a side view, partially in section, of a transport vehicle having a transport temperature control unit.
Figure 2:
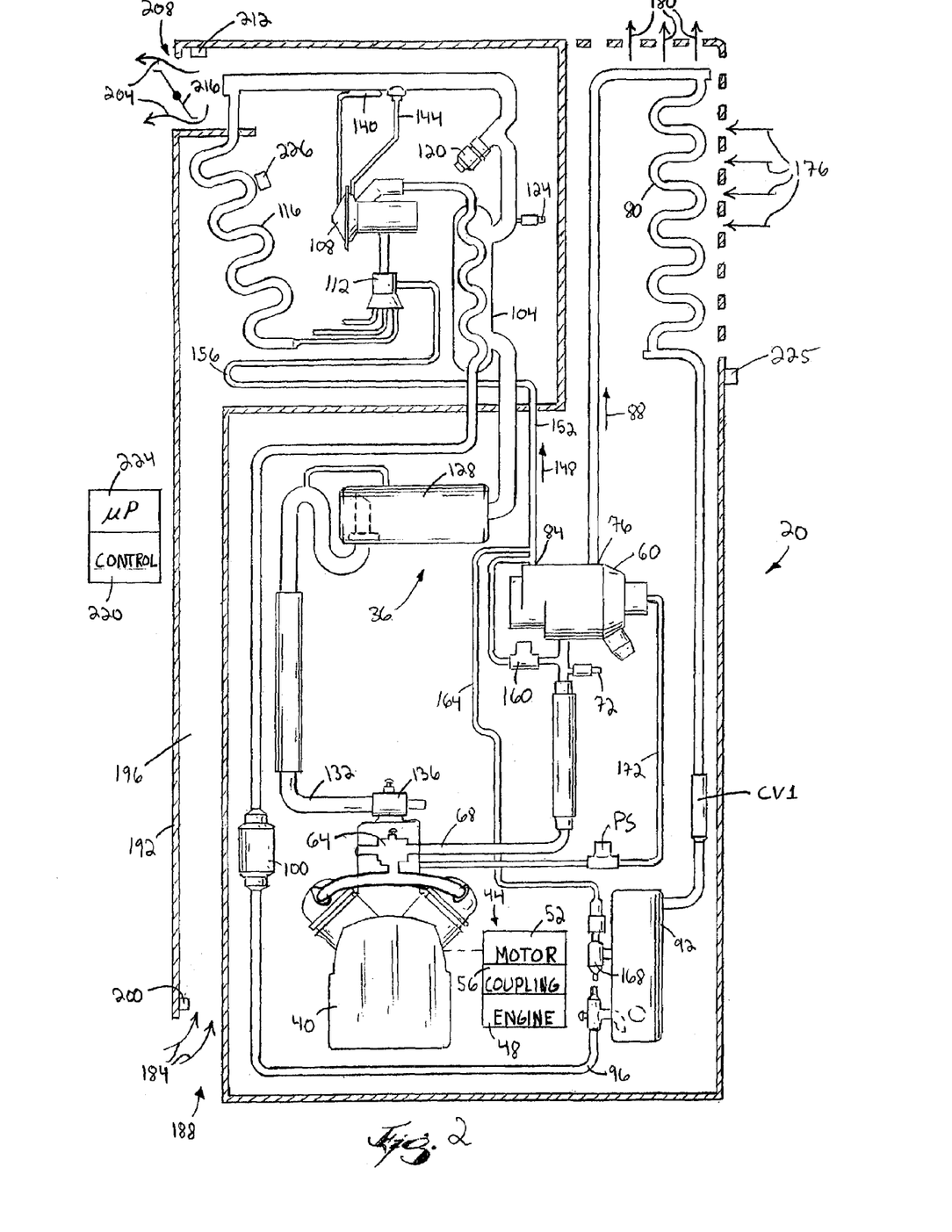
FIG. 2 is a schematic representation of the transport temperature control unit in FIG. 1.

Referring to FIGS. 1 and 2, there is shown a temperature control unit 20 utilizing the present inventive method. The temperature control unit 20 described herein is for example purposes only and is not meant to be limiting. The present inventive method may be used in other temperature control units and still be within the spirit and scope of the present invention. The temperature control unit 20 is especially suitable for use in transport applications and may be mounted on a container, truck, trailer, or any other type of transport vehicle that includes a conditioned space that requires maintenance of a predetermined temperature in order to preserve the quality of the cargo. FIG. 1 shows the unit 20 mounted on a trailer 24 having a conditioned space 28. The trailer 24 is pulled by a tractor 32, as is understood by those skilled in the art.

The temperature control unit 20 controls the temperature in the conditioned space 28 and maintains the temperature within a specified temperature range adjacent to a selected thermal setpoint. The conditioned space 28 may also be divided into a plurality of conditioned spaces having differing respective temperatures in each conditioned space. Each respective temperature being substantially independently controlled by the temperature control unit 20. As seen in FIG. 2, the temperature control unit 20 has a closed fluid refrigerant circuit or flow path 36 that includes a refrigerant compressor 40 driven by a prime mover arrangement 44. The prime mover arrangement 44 of an embodiment of the present invention includes an internal combustion engine 48 and an optional stand-by electric motor 52. The engine 48 and the motor 52, when both are utilized, are coupled to the compressor 40 by a suitable clutch or coupling 56 which disengages the engine 48 while the motor 52 is operative.

Discharge ports of the compressor 40 are connected to an inlet port of a three-way valve 60 via a discharge service valve 64 and a discharge line 68. A discharge pressure transducer 72 is located in the discharge line 68 upstream of the three-way valve 60 to measure the discharge pressure of the compressed refrigerant. The functions of the three-way valve 60, which selects heating and cooling cycles, may be provided by two separate valves, if desired. The three-way valve 60 has a first outlet port 76, which is selected to initiate a cooling cycle, connected to the inlet side of a condenser coil 80. The three-way valve 60 also has a second outlet port 84, which is selected to initiate a heating cycle.

When the three-way valve 60 selects the cooling cycle outlet port 76, it connects the compressor 40 in a first refrigerant flow path 88, which in addition to the condenser coil 80 includes a one-way condenser check valve CVI, a receiver 92, a liquid line 96, a refrigerant drier 100, a heat exchanger 104, an expansion valve 108, a refrigerant distributor 112, an evaporator coil 116, an electronic throttling valve 120, a suction pressure transducer 124, another path through the heat exchanger 104, an accumulator 128, a suction line 132, and returns to a suction port of compressor 40 via a suction line service valve 136. The expansion valve 108 is controlled by a thermal bulb 140 and an equalizer line 144.

When the three-way valve 60 selects the heating cycle outlet port 84, it connects the compressor 40 in a second refrigerant flow path 148. The second refrigerant flow path 148 by-passes the condenser coil 80 and the expansion valve 108, connecting the hot gas output of compressor 40 to the refrigerant distributor 112 via a hot gas line 152 and a defrost pan heater 156. A hot gas by-pass solenoid valve 160 may optionally be disposed to inject hot gas into the hot gas line 152 during a cooling cycle. A by-pass or pressurizing line 164 connects the hot gas line 152 to the receiver 92 via by-pass and check valves 168, to force refrigerant from the receiver 92 into an active refrigerant flow path during heating and defrost cycles.

A conduit or line 172 connects the three-way valve 60 to the low pressure side of the compressor 40 via a normally closed pilot solenoid valve PS. When the solenoid valve PS is de-energized, and thus closed, the three-way valve 60 is spring biased to select the cooling cycle outlet port 76. When the evaporator coil 116 requires defrosting, or when cargo is being conditioned in the conditioned space 28 and requires heat to maintain thermal setpoint, the pilot solenoid valve PS is energized and the low pressure side of the compressor 40 operates the three-way valve 60 to select the heating cycle outlet port 84 to initiate a heating cycle or a defrost cycle.

A condenser fan or blower (not shown), which may be driven by the prime mover arrangement 44, causes ambient air 176 to flow through the condenser coil 80, with the resulting heated air 180 being discharged to the atmosphere. An evaporator fan or blower (also not shown), which also may be driven by the prime mover arrangement 44, draws air 184, called "return air", from the conditioned space 28, through an inlet 188 in a bulkhead 192 and up through a bulkhead space 196. The bulkhead 192 preferably runs substantially the entire height of the conditioned space 28. A return air temperature sensor 200 samples the air temperature from the bottom of the conditioned space 28.

The resulting conditioned cooled or heated air 204, called "discharge air", is returned or discharged by a fan (not shown) into the conditioned space 28 via an outlet 208. A discharge air temperature sensor 212 samples the air temperature of the discharge air. During an evaporator defrost cycle, a defrost damper 216 may be operated to close the discharge air path to the conditioned space 28.

The transport temperature control unit 20 is controlled by an electrical control 220 which includes a microprocessor based controller 224 and electrical control circuits and components, including relays, solenoids, and the like. The controller 224 receives input signals from appropriate sensors, including inputs from a thermal setpoint selector (not shown), which may be actuated to select the desired temperature in the conditioned space 28, the return air temperature sensor 200, the discharge temperature sensor 212, the discharge pressure transducer 72, the suction pressure transducer 124, an ambient air temperature sensor 225 disposed to sense the ambient air temperature, and an evaporator coil temperature sensor 226 disposed to sense the temperature of the evaporator coil 116. The controller 224 provides output signals to, among other things, the electronic throttling valve 120 to control the positioning of the electronic throttling valve 120, as described above. The controller 224 also has a computer program stored therein and performs operations based on the computer program as will be discussed further herein.

Figure 3A:
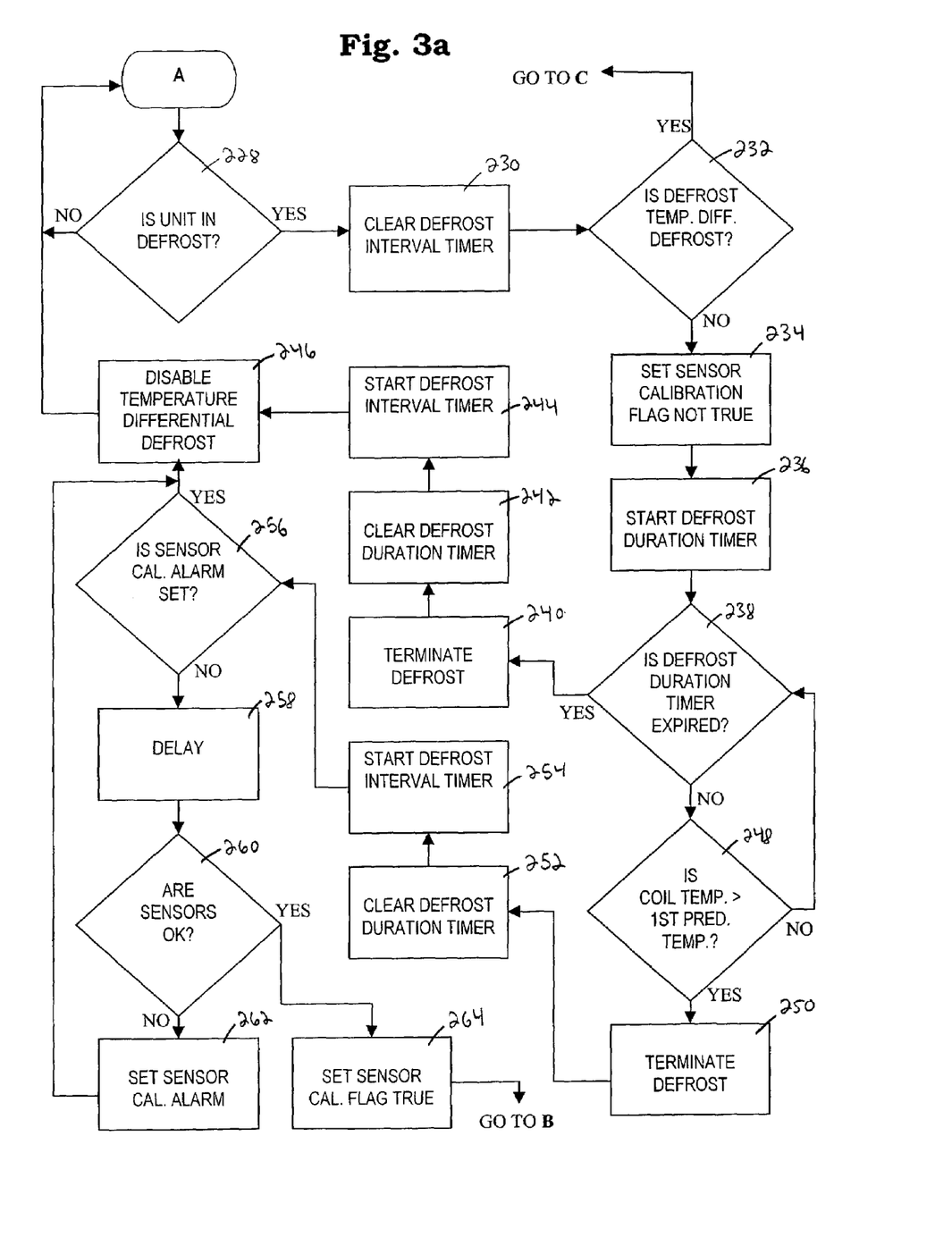
FIGS. 3a–3c show a flow chart illustrating a preferred method in the form of a computer program that can be used to practice the present invention.
Figure 3B:
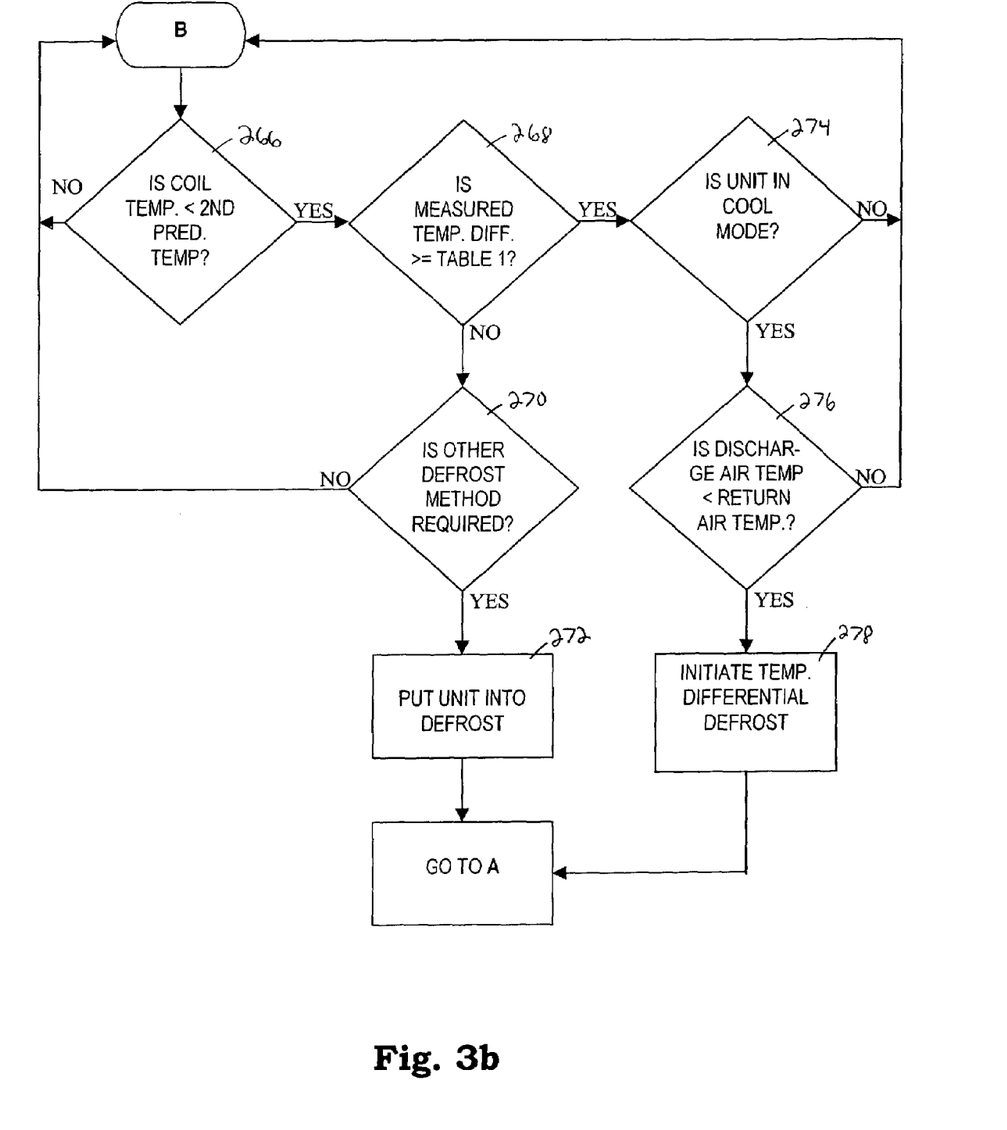
Figure 3C:
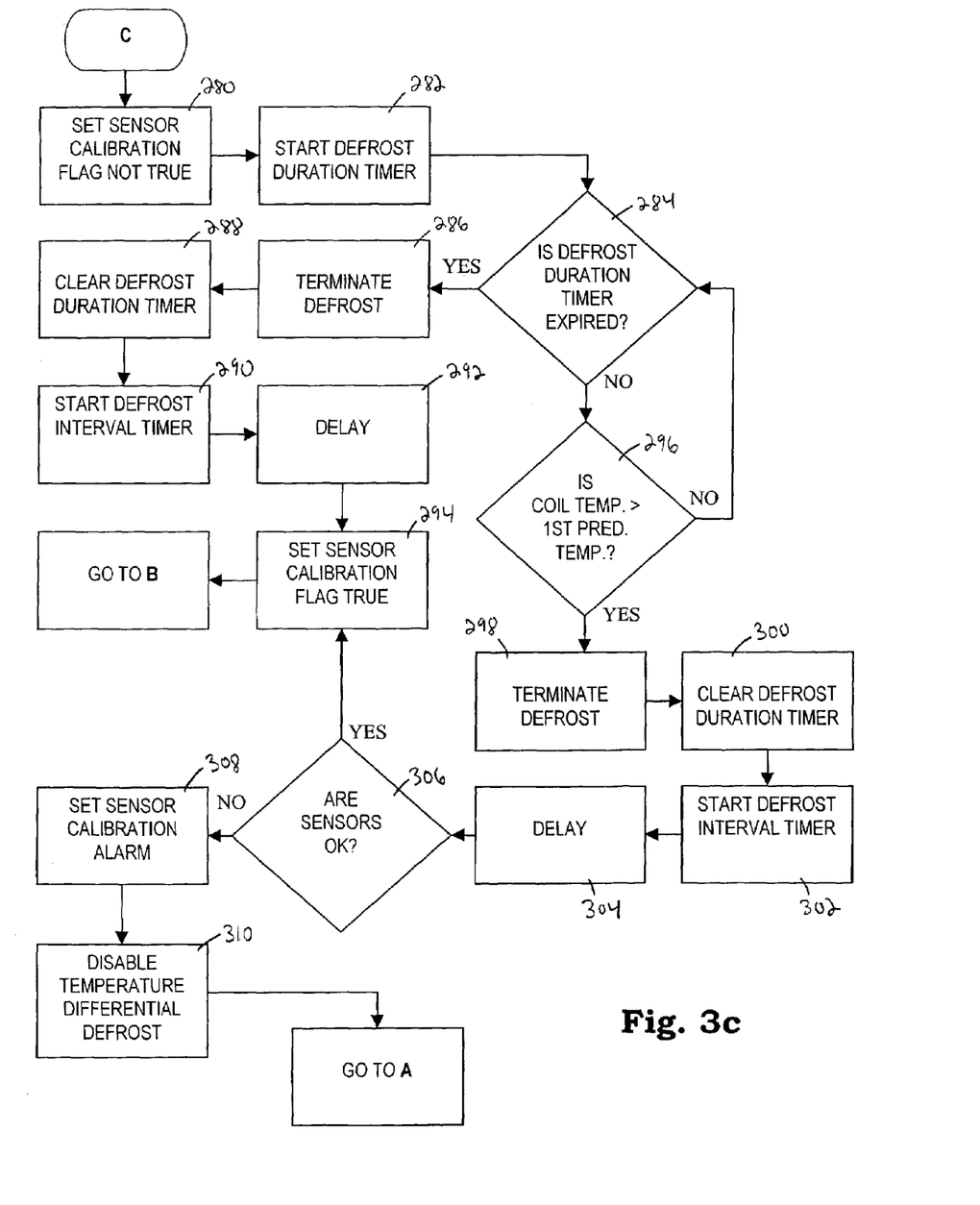

Referring to FIGS. 3a–3c, a flow chart illustrating a preferred method in the form of a computer program that can be used to practice the present invention is illustrated. The present invention can be used to defrost the transport temperature control unit 20. More particularly, the present invention can be used to defrost the evaporator coil 116 of the transport temperature control unit 20. A defrost cycle is generally used to defrost the evaporator coil 116 and includes circulating warm fluid through the evaporator coil 116 to remove condensate therefrom.

Referring to FIG. 3a, the program begins at block A. After block A, the program proceeds to block 228 where it determines if the unit 20 is in defrost. If the unit 20 is not in defrost (NO at block 228), the program returns to block A. If the unit 20 is in defrost (YES at block 228), the program proceeds to block 230 where the program clears the defrost interval timer. The defrost interval timer monitors and/or determines a period of time between two defrost cycles. The period of time can also be referred to as an interval time. After block 230, the program proceeds to block 232 where the program determines if the defrost is a temperature differential defrost.

Temperature differential defrost is a type of defrost cycle that initiates according to certain parameters of the unit 20. More particularly, initiation of the temperature differential defrost is based upon temperature readings sampled from the ambient temperature sensor 225, the return air temperature sensor 200, the discharge air temperature sensor 212, and the evaporator coil temperature sensor 226. With additional reference to Table 1 (illustrated below),

TABLE 1

| Ambient Temperature | OR | Return Air Temperature | Temperature Differential |
|---|---|---|---|
| >or = T1 | | >or = T3 | >or = T5 |
| <T1 but >or = T2 | | <T3 but >or = T4 | >or = T6 |
| <T2 | | <T4 | >or = T7 | initiation of the temperature differential defrost can be determined according to the parameters in Table 1. In an embodiment of the invention, the table is stored in an electronic or computer program format within the controller 224. The unit 20 samples the ambient air temperature and the return air temperature via the ambient air temperature sensor 225 and the return air temperature sensor 200, respectively. The unit 20 then determines whether to initiate or not initiate the temperature differential defrost according to parameters corresponding to one of the ambient air temperature and the return air temperature. In an embodiment of the invention, the lower of the ambient air temperature and the return air temperature determines which parameters (either ambient temperature parameters or return air temperature parameters) will be utilized to determine initiation of the temperature differential defrost. Alternatively, the higher of the ambient air temperature and return air temperature can determine initiation of the temperature differential defrost and still be within the spirit and scope of the present invention. Although ambient air temperature and the return air temperature are sampled to determine initiation of the temperature differential defrost, other temperatures can be sampled in place of the ambient air temperature and the return air temperature to determine initiation of the temperature differential defrost and still be within the spirit and scope of the present invention.

After the lower of the ambient and return air temperatures have been determined, initiation of the temperature differential defrost is determined according to the parameters in the column in Table 1 that correspond with the lower temperature (either the ambient temperature column or the return air temperature column). T1, T2, T3, and T4 are temperatures that define the ranges within the ambient and return air temperature columns. In an embodiment of the invention, T1 and T3 are about 45 degrees Fahrenheit and T2 and T4 are about 0 degrees Fahrenheit, however, T1, T2, T3, and T4 can be any temperature and still be within the spirit and scope of the present invention. Also, temperatures T1 and T3 do not have to be similar temperatures and temperatures T2 and T4 do not have to be similar temperatures. Also, Table 1 can have any number of ranges defined by any number of temperatures and still be within the spirit and scope of the present invention.

Table 1 also includes a temperature differential column having three different predetermined temperature differentials, T5, T6, and T7, that correspond to respective ranges of temperatures for the ambient and return air temperature columns (rows in Table 1). Although Table 1 includes three temperature differentials, Table 1 can include any number of temperature differentials corresponding to the number of ranges of temperatures included in the ambient and return air temperature columns (rows in Table 1). In an embodiment of the invention, temperature differentials are determined by taking the differences in temperature between the return air temperature, the discharge air temperature, and the evaporator coil temperature. In other words, a temperature differential can be the difference in temperature between the return air temperature and the discharge air temperature, the return air temperature and the evaporator coil temperature, and the discharge air temperature and the evaporator coil temperature.

The return, discharge, and evaporator coil air temperatures are sampled by their respective sensors, which send a signal to the controller. The controller then compares the signals received from the sensors and forms measured temperature differentials. The controller 224 then selects the largest measured temperature differential (largest temperature gap between two temperatures) and compares it to one of the predetermined temperature differentials in Table 1. The predetermined temperature differential, to which the largest measured temperature differential is compared, is selected according to the temperature range in which the lower of the ambient air temperature and return air temperature falls. If the largest measured temperature differential is greater than or equal to the corresponding predetermined temperature differential, a temperature differential defrost initiates. In an embodiment of the invention, predetermined temperature differential T5 is about 40 degrees Fahrenheit, predetermined temperature differential T6 is about 35 degrees Fahrenheit, and predetermined temperature differential T7 is about 30 degrees Fahrenheit, however, predetermined temperature differentials T5, T6, and T7 can be any predetermined temperature differential and still be within the spirit and scope of the present invention.

An example will be discussed herein for discussion purposes only and, therefore, is not meant to limit the scope of the present invention in any way. In this example, T1 is 50 degrees F., T2 is 15 degrees F., T3 is 45 degrees F., T4 is 5 degrees F., T5 is 40 degrees F., T6 is 35 degrees F., and T7 is 30 degrees F. The unit 20 monitors the ambient air temperature, which is 38 degrees F., and the return air temperature, which is 47 degrees F. In this example, the ambient air temperature is lower than the return air temperature, therefore, the ambient temperature column in Table 1 will be used. Referring to Table 1, 38 degrees F. falls into the middle range of temperatures (between 15 degrees F. and 50 degrees F.), which corresponds with the temperature differential T6, or 35 degrees F. In order for a temperature differential defrost to initiate, the largest measured temperature differential between the return air temperature, the discharge air temperature, and the evaporator coil temperature must be greater than 35 degrees F.

If the defrost is not a temperature differential defrost (NO at block 232), the program proceeds to block 234 where the program sets the sensor calibration flag not true. If the sensor calibration flag is set not true, a temperature differential defrost cycle cannot run. Sensor calibration flags are well known to those skilled in the art and, therefore, will not be discussed further herein. The program then proceeds to block 236 and starts a defrost duration timer. The defrost duration timer monitors and/or determines a period of time between the initiation and the termination of a defrost cycle. The period of time can also be referred to as a duration time. After block 236, the program proceeds to block 238 where the program determines if the defrost duration timer is expired. If the defrost duration timer is expired (YES at block 238), the program proceeds to block 240 where the program terminates the defrost. The program then proceeds to block 242 and clears the defrost duration timer. After block 242, the program proceeds to block 244 and starts the defrost interval timer. The program then proceeds to block 246 and disables the temperature differential defrost. As used herein, disable means that temperature differential defrost can not initialize, and disable does not mean that temperature differential defrost is terminated. After block 246, the program returns to block A.

Referring back to block 238, if the program determines that the defrost duration timer is not expired (NO at block 238), the program proceeds to block 248 where the program determines if the evaporator coil temperature is greater than a first predetermined temperature. In an embodiment of the invention, the first predetermined temperature is about 58 degrees F., however, the first predetermined temperature can be any temperature and still be within the spirit and scope of the present invention. If the evaporator coil temperature is not greater than the first predetermined temperature (NO at block 248), the program returns to block 238. If the evaporator coil temperature is greater than the first predetermined value (YES at block 248), the program proceeds to block 250 where the defrost is terminated. The program then proceeds to block 252 and clears the defrost duration timer. After block 252, the program proceeds to block 254 and starts the defrost interval timer. The program then proceeds to block 256 where the program determines if the sensor calibration alarm is set. The sensor calibration alarm will typically be set when a sensor has previously been identified as faulty. For example, a sensor may have been identified as faulty in a previous run of the unit or at anytime between the last defrost cycle and block 256. If all sensors are operating correctly, then the sensor calibration alarm is not set. If the sensor calibration alarm is set (YES at block 256), the program proceeds to block 246 and disables the temperature differential defrost. The program then returns to block A.

Referring back to block 256, if the program determines that the sensor calibration alarm is not set (NO at block 256), the program proceeds to block 258 where a delay occurs. After block 258, the program proceeds to block 260 where the program determines if the sensors are correctly operating.

If the sensors are not operating correctly (NO at block 260), the program proceeds to block 262 and sets the sensor calibration alarm (discussed above). The program then proceeds to block 246 and disables the temperature differential defrost. In an embodiment of the invention, the sensors can be compared to predetermined sensor parameters (not shown) to determine if the sensors are operating correctly. In such an embodiment, the predetermined sensor parameters can be stored in the controller 224. After block 246, the program returns to block A.

Referring back to block 260, if the sensors are operating correctly (YES at block 260), the program proceeds to block 264 and sets the sensor calibration flag true. If the sensor calibration flag is set true, temperature differential defrost is enabled. As used herein with respect to temperature differential defrost, enable means that the temperature differential defrost can initiate at a later time after being enabled, and enable does not mean that a temperature differential defrost is initiated. The program then proceeds to block B.

Referring to FIG. 3b, after block B, the program proceeds to block 266 where the program determines if the evaporator coil temperature is less than a second predetermined value. In an embodiment of the invention, the second predetermined value is about 42 degrees Fahrenheit, however, the second predetermined value can be any temperature and still be within the spirit and scope of the present invention. If the evaporator coil temperature is not less than the second predetermined value (NO at block 266), the program returns to block B. If the evaporator coil temperature is less than the second predetermined value, the program proceeds to block 268 where the program determines if the measured temperature differential is greater than the corresponding temperature differential in Table 1. The measured temperature differential and the corresponding temperature differential are determined as discussed above. If the measured sensor temperature differential is not greater than the corresponding temperature differential in Table 1 (NO at block 268), the program proceeds to block 270 where the program determines if another defrost method or cycle is required.

It is sometimes desirable for the unit 20 to utilize multiple types of defrost cycles for defrosting the evaporator coil. In these cases, the controller may be executing other defrost programs in parallel with the current defrost program. It may be determined from execution of the other defrost programs that the unit 20 requires other defrost cycles. The program determines if any other defrost methods or cycles are required at Block 270. If another defrost method is not required (NO at block 270), the program returns to block B. If another defrost method is required (YES at block 270), the program proceeds to block 272 and puts the unit 20 into the required type of defrost cycle or method. After block 272, the program proceeds to block A.

Referring back to block 268, if the measured sensor temperature differential is greater than the corresponding temperature differential in Table 1 (YES at block 268), the program proceeds to block 274 where the program determines if the unit 20 is in cool mode. If the unit 20 is not in cool mode (NO at block 274), the program returns to block B. If the unit 20 is in cool mode (YES at block 274), the program proceeds to block 276 where the program determines if discharge air temperature is less than return air temperature. If the discharge air temperature is not less than the return air temperature (NO at block 276), the program returns to block B. If the discharge air temperature is less than the return air temperature (YES at block 276), the program proceeds to block 278 and a temperature differential defrost cycle initiates. After block 278, the program proceeds to block A.

Referring back to FIG. 3a and block 232, if the defrost is a temperature differential defrost (YES at block 232), the program proceeds to block C.

Referring to FIG. 3c, after block C, the program proceeds to block 280 and sets the sensor calibration flag not true. The program then proceeds to block 282 and starts the defrost duration timer. After block 282, the program proceeds to block 284 and determines if the defrost duration timer is expired. If the defrost duration timer is expired (YES at block 284), the program proceeds to block 286 and terminates defrost. The program then proceeds to block 288 and clears the defrost duration timer. After block 288, the program proceeds to block 290 and starts the defrost interval timer. The program then proceeds to block 292 where a delay occurs. After block 292, the program proceeds to block 294 and sets the sensor calibration flag true. The program then proceeds to block B.

Referring back to block 284, if the defrost duration timer is not expired (NO at block 284), the program proceeds to block 296 where the program determines if the evaporator coil temperature is greater than the first predetermined temperature. If the evaporator coil temperature is not greater than the first predetermined temperature (NO at block 296), the program returns to block 284.

Referring back to block 296, if the evaporator coil temperature is greater than the first predetermined temperature (YES at block 296), the program proceeds to block 298 and terminates defrost. After block 298, the program proceeds to block 300 and clears the defrost duration timer. The program then proceeds to block 302 and starts the defrost interval timer. After block 302, the program proceeds to block 304 and a delay occurs. The program then proceeds to block 306 where the program determines if the sensors are operating correctly. If the sensors are operating correctly (YES at block 306), the program proceeds to block 294 and sets the sensor calibration flag true. The program then proceeds to block B.

Referring back to block 306, if the sensors are not operating correctly (NO at block 306), the program proceeds to block 308 and sets the sensor calibration alarm. The program then proceeds to block 310 and disables temperature differential defrost. After block 310, the program proceeds to block A.

Although particular embodiments of the present invention have been shown and described, other alternative embodiments will be apparent to those skilled in the art and are within the intended scope of the present invention.

The invention claimed is:

1. A transport temperature control unit comprising:
   an evaporator coil;
   a first temperature sensor operable to sense a first temperature;
   a second temperature sensor operable to sense a second temperature; and
   a controller operable to control the transport temperature control unit and being in communication with the first and second temperature sensors to receive the first and second temperatures, the controller being operable to compare the first temperature to the second temperature to determine which of the first temperature and the second temperature is lower, and wherein the controller initiates the defrost cycle dependent on the lower of the first temperature and the second temperature.

2. The transport temperature control unit as claimed in claim 1, wherein the first temperature sensor is an ambient temperature sensor and wherein the first temperature is an ambient temperature, and wherein the second temperature sensor is a return air temperature sensor and wherein the second temperature is a return air temperature.

3. A transport temperature control unit comprising:
   an evaporator coil;
   a first temperature sensor operable to sense a first temperature;
   a second temperature sensor operable to sense a second temperature;
   a third temperature sensor operable to sense a third temperature; and
   a controller operable to control the transport temperature control unit and being in communication with the first, second and third temperature sensors to receive the first, second and third temperatures, the controller including a predetermined temperature differential stored therein and being operable to compare two of the first, second and third temperatures to provide a first temperature differential and compare another two of the first, second and third temperatures to provide a second temperature differential, wherein the controller is operable to compare one of the first and second temperature differentials with the predetermined temperature differential.

4. The transport temperature control unit as claimed in claim 3, wherein a larger of the first and second temperature differentials is compared to the predetermined temperature differential.

5. The transport temperature control unit as claimed in claim 4, wherein the controller initiates a defrost cycle when the largest one of the first and second temperature differentials is greater than the predetermined temperature differential.

6. The transport temperature control unit as claimed in claim 3, wherein the first temperature sensor is a return air temperature sensor and wherein the first temperature is a return air temperature, and wherein the second temperature sensor is a discharge air temperature sensor and wherein the second temperature is a discharge air temperature, and wherein the third temperature sensor is an evaporator coil temperature and wherein the third temperature is an evaporator coil temperature.

* * * * *